W. A. VAN BERKEL.
RATCHET MECHANISM.
APPLICATION FILED DEC. 31, 1917.
1,261,192.
Patented Apr. 2, 1918.
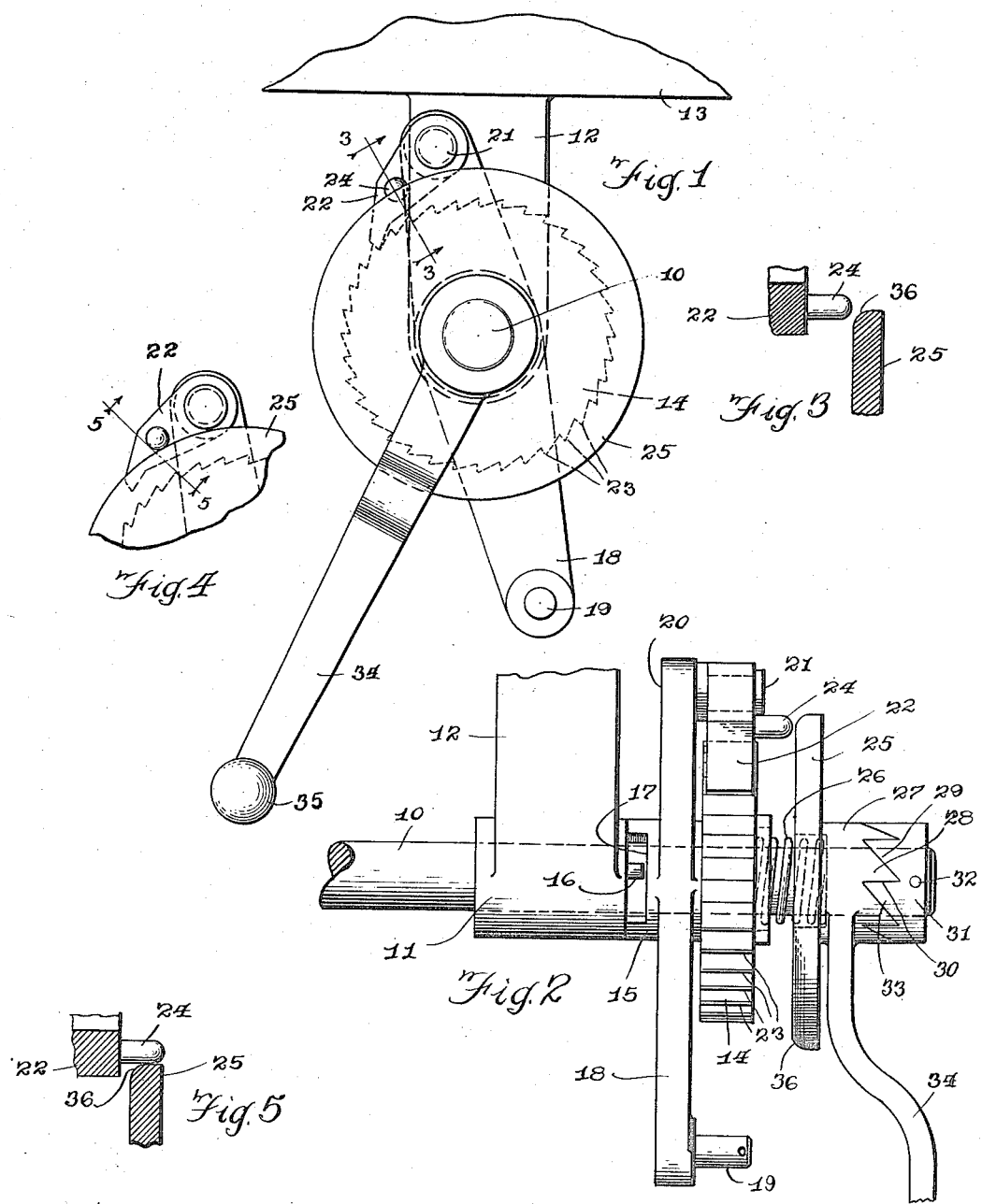
Witness:
L. B. Graham
Inventor:
Wilhelmus A. van Berkel
By ...
Att'ys.

UNITED STATES PATENT OFFICE.

WILHELMUS A. VAN BERKEL, OF ROTTERDAM, NETHERLANDS, ASSIGNOR TO U. S. SLICING MACHINE COMPANY, OF LA PORTE, INDIANA, A CORPORATION OF INDIANA.

RATCHET MECHANISM.

1,261,192.  Specification of Letters Patent.  Patented Apr. 2, 1918.

Application filed December 31, 1917. Serial No. 209,612.

*To all whom it may concern:*

Be it known that I, WILHELMUS A. VAN BERKEL, a subject of the Queen of the Netherlands, and a resident of Rotterdam, Netherlands, have invented certain new and useful Improvements in Ratchet Mechanism, of which the following is a specification.

This invention relates to ratchet mechanism applicable to many kinds of machinery and especially useful in connection with slicing machines, and has for its object the provision of mechanism of the character mentioned which shall be of improved construction and more efficient and convenient in operation than similar mechanism previously known.

The invention is exemplified in the combination and arrangement of parts shown in the accompanying drawing and described in the following specification, and it is more particularly pointed out in the appended claims.

In the drawing, Figure 1 is an end elevation of one form of mechanism embodying the present invention, Fig. 2 is a side elevation of the mechanism shown in Fig. 1, Fig. 3 is a fragmentary detail section on line 3—3 of Fig. 1, Fig. 4 is a fragmentary detail showing the mechanism in a position different from that shown in Fig. 1, Fig. 5 is a section on line 5—5 of Fig. 4.

The particular embodiment of the invention shown in the drawing is one which may be used in connection with the feed of a meat slicing machine, but it should be understood that the invention is not confined to any particular form of machine, but is capable of a great variety of uses. In the drawing, the numeral 10 designates a shaft mounted for rotation in a bearing 11 supported by a bracket 12 which is carried by a portion of the framework 13 of the machine, of which the mechanism forms a part. A ratchet wheel 14 is rigidly mounted on the shaft 10 and is spaced from the end of the bearing 11 by means of a collar 15 which is free to rotate upon the shaft. The amount of rotation of the collar 15, about the shaft 10, is limited by a stop pin 16 which projects from the bearing 11 into an elongated notch 17 formed in the periphery of the collar 15. The collar 15 is provided with an arm 18 by means of which the collar may be oscillated upon the shaft 10, a bearing pin 19 being carried at the extremity of the arm 18 for coöperation with any suitable oscillating member. In a slicing machine, the pin 19 is provided with a roller arranged to contact with a fixed stop, the movement of the arm 18 being imparted thereto by reciprocation of the frame 13 which periodically brings the roller on the pin 19 into contact with the stop. It will be apparent that a pitman rod or any other well known mechanical contrivance could be used to oscillate the pin 19.

A second arm 20 is connected with the collar 15 and is provided with a pivot pin 21 on which is mounted a pawl 22. The pawl 22 is arranged to engage the teeth 23 of the ratchet wheel 14 to impart intermittent rotary movement to the ratchet wheel when the collar 15 is oscillated upon the shaft 10. A pin 24 is carried by the pawl 22 and extends laterally therefrom into the path of movement of a disk 25 which is slidably mounted on the shaft 10. A coil spring 26 is interposed between the disk 25 and the ratchet wheel 14, and normally holds the wheel and disk a sufficient distance from one another, so that the disk is free from the pin 24, as shown in Fig. 2. The disk 25 has formed integrally therewith a bearing sleeve 27 which surrounds the shaft 10 on the side of the disk opposite the spring 26, and is provided, at its end, with a series of notches 28 having one side inclined, as shown at 29, and the other side straight, as shown at 30. A collar 31 is rigidly connected with the shaft 10 by a pin 32 and is provided with notches 33 arranged to mesh with the notches 28 on the collar 27. A hand crank 34 is formed on the sleeve 27 and is provided with a handle 35 by means of which the sleeve 27 may be rotated.

In operation, a step by step rotary movement is imparted to the shaft 10 through the ratchet wheel 14 and the pawl 22 whenever the arm 18 is oscillated. If it is desired to impart a continuous rotary movement to the shaft 10 in the same direction as that imparted to it by the ratchet mechanism, it is only necessary to grasp the handle 35 and rotate the handle in the direction indicated. This will cause the square surfaces of the teeth 28 and 33 to bear upon one another and thus impart a rotary movement to the shaft, the nature of the movement being the same as that given to the hand crank. During this movement, the pawl 22 simply overrides the teeth on the ratchet wheel 14. If, for any reason, it is desired to rotate the shaft 10 in an opposite direction, it is only necessary to grasp the handle 35 and turn the crank 34 in such direction. When this is done, the beveled surfaces of the teeth 28 and 33 will slide upon one another and force the disk 25 to the left, as shown in Fig. 2. This will bring the rounded edge 36 (Fig. 3) of the disk 25 into contact with the rounded end of the pin 24 on the pawl 22 and thus raise the pawl out of engagement with the teeth 23 as the disk is moved into the position shown in Figs. 4 and 5. The amount of movement of the disk 25 to the left is limited by contact between the disk and the ratchet wheeel 14, and the parts are so proportioned that the movement of the disk along the shaft is stopped before the teeth 28 and 33 become disengaged from one another. When the disk 25 has reached the extremity of its movement along the shaft, a further rotation of the handle 35 will cause the shaft 10 to move in unison with the handle and thus rotated in the direction opposite to that in which it is driven by the pawl and ratchet. During this rotary movement the pin 24 rests upon the periphery of the disk 25 and the pawl 22 is thus held out of engagement with the ratchet teeth 23 so that the ratchet wheel is free to rotate in unison with the shaft. It will be apparent that in constructions where a holding pawl is used in connection with the operating pawl, that both pawls may be lifted out of engagement with the ratchet wheel in the manner described in connection with the pawl 22.

I claim:

1. In combination, a movable member, ratchet mechanism for operating upon said member in one direction, and means for moving said member in another direction and for releasing said ratchet mechanism to permit such movement.

2. In combination, a rotary member, ratchet mechanism for driving said member in one direction, and means for rotating said member in the opposite direction and for releasing said ratchet mechanism to permit such rotation.

3. In combination, a rotary member, ratchet mechanism for driving said member in one direction, and means for driving said member in the opposite direction and for automatically releasing said ratchet mechanism to permit such reverse driving operation.

4. In combination, a rotary member, ratchet mechanism for driving said member in one direction, a second device for driving said member in either direction, and means for automatically controlling said ratchet mechanism to prevent interference thereby with said second driving device whenever said second driving device is operated.

5. In combination, a rotary member, a pawl for operating said member, a second device for rotating said member, and means for automatically disengaging said pawl from said member when said second device is operated to rotate said member in one direction.

6. In combination, a rotary member, a pawl for operating said member, a second device for rotating said member, means for disengaging said pawl from said member, and means for operating said disengaging means at the beginning of an operation of said second device.

7. In combination, a rotary shaft, a ratchet wheel secured to said shaft, a pawl arranged to engage said ratchet wheel, mechanism other than said pawl and ratchet for rotating said shaft, and means for automatically disengaging said pawl from said ratchet whenever said mechanism is operated to rotate said shaft in one direction.

8. In combination, a rotary shaft, a ratchet wheel connected with said shaft, a pawl for engaging said ratchet, means slidable along said shaft into and out of engagement with said pawl and arranged to disconnect said pawl from said ratchet when moved into engagement therewith, and means for connecting said shaft with said sliding means to cause the two to rotate together.

9. In combination, a shaft, a ratchet wheel mounted on said shaft, a pawl for engaging said ratchet, a sleeve slidably mounted on said shaft and movable into engagement with said pawl to disengage said pawl from said ratchet, means for rotating said sleeve to drive said shaft, and means for automatically moving said sleeve along said shaft to disengage said pawl when said sleeve is rotated in one direction.

10. In combination, a shaft, a ratchet wheel secured to said shaft, a pawl for engaging said ratchet wheel, a sleeve slidably mounted on said shaft, means carried by said sleeve for disengaging said pawl from said ratchet when said sleeve is moved into one position along said shaft, means for rotating said sleeve and shaft in unison with one another, means for sliding said sleeve along said shaft to disengage said pawl from said ratchet when said sleeve is rotated in one direction, and a spring for moving said sleeve to permit reëngagement of said pawl and ratchet when said rotary movement of said sleeve is discontinued.

11. In combination, a movable member, ratchet mechanism for operating said member, and means operable independently of the position of the parts of said ratchet mechanism for automatically releasing said ratchet mechanism when the direction of movement of said member is reversed.

12. In combination, a movable member, ratchet mechanism for operating said member, and means for rotating said member in a reverse direction, said means being operable independently of the position of the parts of said ratchet mechanism to release said ratchet mechanism to permit reverse movement of said member.

In testimony whereof I have signed my name to this specification, on this nineteenth day of November A. D. 1917.

WILHELMUS A. van BERKEL.

Witnesses:
S. G. J. SMEDT,
N. H. VAN NEEM.